(12) United States Patent
Zimmer et al.

(10) Patent No.: US 9,384,039 B2
(45) Date of Patent: *Jul. 5, 2016

(54) PARALLEL MEMORY MIGRATION (75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/104,883

(22) Filed: May 10, 2011

(65) Prior Publication Data

US 2011/0213942 A1    Sep. 1, 2011

Related U.S. Application Data (63) Continuation of application No. 11/528,887, filed on Sep. 28, 2006, now Pat. No. 7,941,624.

(51) Int. Cl.
- *G06F 12/00* (2006.01)
- *G06F 9/48* (2006.01)
- *G06F 12/02* (2006.01)
- *G06F 9/44* (2006.01)

(52) U.S. Cl.
CPC ............ *G06F 9/4812* (2013.01); *G06F 9/4411* (2013.01); *G06F 12/02* (2013.01)

(58) Field of Classification Search
CPC ...... G06F 9/4812; G06F 9/4411; G06F 12/02
See application file for complete search history.

(56) References Cited

U.S. PATENT DOCUMENTS

| | | | |
|---|---|---|---|
| 5,437,039 A | 7/1995 | Yuen | |
| 5,560,019 A | 9/1996 | Narad | |
| 6,212,587 B1 | 4/2001 | Emerson et al. | |
| 6,453,278 B1 | 9/2002 | Favor | |
| 6,775,728 B2 * | 8/2004 | Zimmer et al. | 710/260 |
| 2001/0016892 A1 | 8/2001 | Klein | |
| 2005/0188278 A1 * | 8/2005 | Zimmer et al. | 714/42 |
| 2006/0069953 A1 * | 3/2006 | Lippett et al. | 714/25 |

OTHER PUBLICATIONS

Giroir D. et al., "Interupt Dispatching Method for Multiprocessing System", IBM Technical Disclosure Bulletin, Sep. 1984, USA, vol. 27, No. 48, pp. 2356-2359, XP002232995, ISSN: 0018-8689.

(Continued)

*Primary Examiner* — Shawn X Gu
(74) *Attorney, Agent, or Firm* — Blakely, Sokoloff, Taylor & Zafman LLP (57) ABSTRACT

A method and apparatus is described herein for performing parallel memory migration, as well as execution of management tasks over a plurality of management windows. Handlers are dispatched to multiple resources, such as processing elements or threads, to determine a proper memory migration handler. Each resource, during a management mode, executes a designated memory migration handler or an instance of a memory migration handler to perform a portion of a memory migration task in parallel. A task data structure is capable of supporting tracking of portions of memory migrated. In addition the task data structure is potentially also capable of tracking management tasks through plurality of management windows to support servicing of management tasks through multiple management windows.

23 Claims, 5 Drawing Sheets

(56) References Cited

OTHER PUBLICATIONS

Anonymous, "The Peripheral Component Interconnect (PCI) Bus and vxWorks", Online, Apr. 1998 XP002232997, Retrieved from the Internet: URL:ece-www.colorado.edu/{ecen5633/vxworks_pci. pdf, pp. 49-2, section, PCI Interrupt Handling.

* cited by examiner

PARALLEL MEMORY MIGRATION

PRIORITY

This application claims priority to U.S. patent application titled, "Parallel Memory Migration", Ser. No. 11/528,887, filed on Sep. 28, 2006, now Issued U.S. Pat. No. 7,941,624, Issued on May 10, 2011.

FIELD

This invention relates to the field of computing systems, and, in particular, to performing memory operations in different execution modes of processors.

BACKGROUND

Since the 386SL processor was introduced by the Intel Corporation, system management mode (SMM) has been available on IA32 processors as an execution mode that executes code loaded by BIOS or firmware. SMM is a special-purpose operating mode provided for handling system-wide functions like power management, system hardware control, or proprietary OEM-designed code.

Special-purpose operation modes are typically entered in response to an interrupt signal. For example in IA32 processors, SMM is entered in response to a System Management Interrupt (SMI) signal, while in some server processors a similar interrupt signal is referred to a processor management interrupt (PMI) signal. For simplicity, SMI and PMI signals are often referred to as xMI signals.

To date, most BIOS implementations that leverage the SMM capability of the foregoing Intel processors simply register a monolithic section of code that is created during the build of the BIOS to support a specific function or set of functions particular to systems that use the BIOS. Furthermore, in multi-processor systems, in response to an xMI signal, all processors are activated into a management mode. However, only one processor services the xMI request, while the rest of the processors wait to re-enter normal operation. Therefore, as the number of cores on a single processor grow from two and four cores to larger numbers, such as sixteen and thirty two cores, a potentially greater number of processor are idle during a management mode.

In addition to the number of cores growing on processors, the amount of memory available in a platform is also expanding at a rapid rate. As a result, functions such as memory migration, i.e. the moving of data/information from one portion of memory to another portion of memory, require more execution time and power to complete. Consequently, the longer execution times of tasks, such as memory migration, in combination with the growing number of cores, results in a larger amount of time that greater processing resources sit idle wasting potential execution power.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific management modes, data structures, and storage medium in order to provide a thorough understanding of the present invention. It will be apparent, however, to one skilled in the art that these specific details need not be employed to practice the present invention. In other instances, well known components or methods, such as specific management mode implementation, instructions, computer architectures, and driver code have not been described in detail in order to avoid unnecessarily obscuring the present invention.

The method and apparatus described herein are for performing parallel management mode task execution, as well as execution of management mode tasks that span a plurality of management windows, both of which are specifically discussed in reference to a multi-core computer system. However, the methods and apparatus for parallel execution and task spanning are not so limited, as they may be implemented on or in association with any integrated circuit devices, such as a notebook, a desktop machine, a server platform, an embedded system, or a personal digital assistant (PDA).

Figure 1:
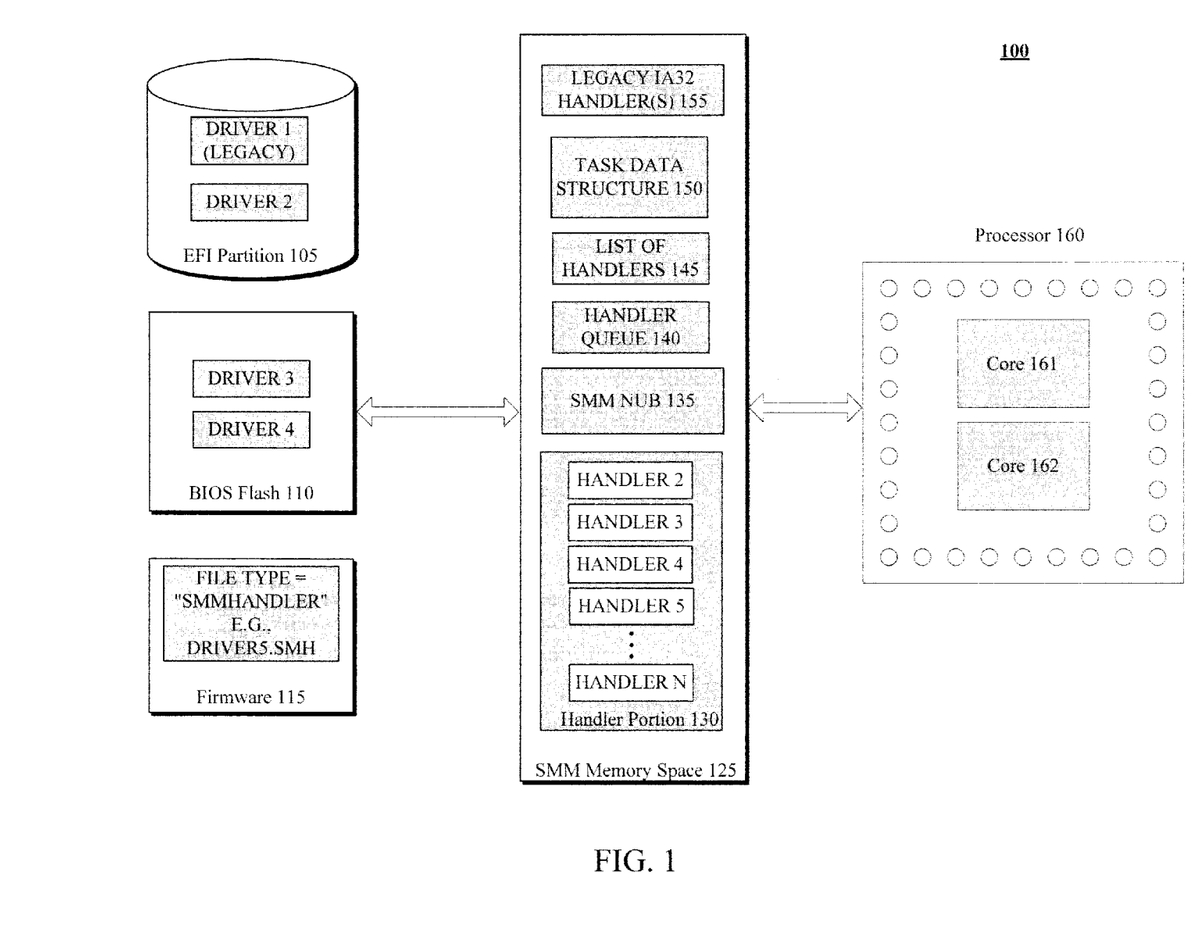
FIG. 1 illustrates an embodiment of a system capable of executing management tasks spanning multiple windows and capable of concurrently executing memory migration code on multiple cores.

Referring to FIG. 1 an embodiment of a multi-core system capable of concurrently executing driver/handler code to service a memory migration event is illustrated. In addition, system 100, as illustrated, is also potentially capable of executing code to concurrently service a previous management mode task and a second task, such as another previous management mode task or a current management mode task. In one embodiment, system 100 includes an Extensible Firmware Interface (EFI) framework, which defines a model for the interface between operating systems and platform firmware. The interface typically consists of data tables that contain platform-related information, plus boot and runtime service calls that are available to the operating system and its loader. Together, these provide a standard environment for booting an operating system and running pre-boot applications. More information on EFI may be found at http://uefi.org, including the current UEFI specification version 2.

An EFI framework provides for legacy and add-on drivers that are stored on any variety of storage devices. As a result, legacy drivers may be included in system 100, as well as drivers from third parties for added devices. Here, legacy driver 1 and driver 2 are stored in an EFI system partition on persistent memory, such as a hard drive. Driver 3 and driver 4 are stored on BIOS Flash 110. In addition to these types of storage devices, the drivers may be stored on other persistent storage devices that are accessible to the computer system in which the invention is implemented, including motherboard-based ROMs, option-ROMs contained on add-on peripheral cards, local hard disks and CD ROMs, which are collectively depicted by firmware 115.

Typically, during boot, i.e. instantiation of an EFI framework, storage, such as partition 105, flash 110, and firmware 115, is scanned for drivers to be loaded into SMM memory space 125. SMM memory space 125 may be included in any memory device associated with processor 160. As a first example, the memory is a random access memory (RAM) associated with processor 160 and shared with a computer system including processor 160. However, the memory may be included in processor 160, as well as be any type of memory such as a non-volatile memory, dynamic RAM (DRAM), static RAM (SRAM), or other memory.

In one embodiment, an EFI SMM base, i.e. SMM BASE, protocol driver is installed. Once installed, an SMM handler register service is published to scan for legacy and add-on drivers. Add-on drivers usually refer to drivers and firmware files that were not provided with the original firmware of a computer system as provided by an original equipment manufacturer (OEM). As an illustrative example, drivers that are designated for servicing xMIs are denoted by an extension .SMH, such as driver5.smh stored in firmware 115. An xMI refers to a management interrupt, such as a system management interrupt (SMI) in the Intel family of desktop processors or a processor management interrupt (PMI) in the Intel family of server processors.

In one embodiment, SMM Nub 135 is loaded into SMM memory space 125 during initialization, or during installation of an EFI SMM base protocol driver. SMM Nub 135 is responsible for coordinating activities during a system management mode of execution, including providing an SMM library to event handlers, which includes resource services, memory allocation services, and configuration table registration.

In addition, legacy handlers 155 and event handlers 2, 3, 4, and 5 through N are also loaded into SMM memory space 125. An event handler usually comprises a set of code, i.e., coded machine instructions, that, when executed by a system processor, performs an event service function in a manner similar to an interrupt service routine. Typically, each SMM event handler will contain code to service a particular hardware component or subsystem, or a particular class of hardware. For example, SMM event handlers may be provided for servicing errors cause by the system's real time clock, I/O port errors, PCI device errors, etc. In general, there may be some correspondence between a given driver and an SMM event handler. However, this is not a strict requirement, as the handlers may comprise a set of functional blocks extracted from a single driver file or object.

When event handler 155 for legacy driver 1 is registered, it is loaded into SMM memory space 125. A legacy handler is an event handler that is generally provided with the original system firmware and represents the conventional mechanism for handling an xMI event. As each add-on SMM event handler is registered, it is loaded into handler portion 130; once all of the event handlers are loaded, add-on event handler portion 130 comprises a set of event handlers, handlers 2-5, which correspond to add-on drivers 2-5, respectively. In one embodiment, as each event handler is registered, it is authenticated to ensure that the event handler is valid for use with the particular processor and/or firmware for the computer system. For example, an encryption method that implements a digital signature and public key is used. Moreover, as handlers 2-5 are registered, they are added to a list of handlers 145.

In one embodiment, list of handlers 145 is copied into handler queue 140, which is utilized to dispatch handlers to multiple available processing resources, such as cores 161 and 162 on processor 160. A core often refers to any logic located on an integrated circuit capable of maintaining an independent architectural state, wherein each independently maintained architectural state is associated with at least some dedicated execution resources. Moreover, a hardware thread typically refers to any logic located on an integrated circuit capable of maintaining an independent architectural state, wherein the independently maintained architectural states share access to execution resources. As can be seen, when certain processing resources are shared and others are dedicated to an architectural state, the line between the nomenclature of a hardware thread and core overlaps. Yet often, a core and a hardware thread are viewed by an operating system as individual logical processors, with each logical processor capable of executing at least one software thread. Therefore, a processor, such as processor 160, is capable of concurrently executing multiple threads on cores 161 and 162.

Concurrent event handler execution on multiple physical processors utilizing a handler queue is discussed in U.S. Pat. No. 6,775,728 entitled, "Method and System for Concurrent Handler Execution in an SMI and PMI-Based Dispatch Execution Framework."

Task data structure 150 is also stored in memory space 125. In one embodiment, task data structure 150 is to store task/event entries associated with xMI events/tasks to support single task execution across multiple management mode windows. Previously, xMI tasks were serviced/handled in a single management mode window. Here, a management mode window refers to an amount of time between an entrance into a management mode and an exit out of a management mode. However, as tasks, such as memory migration, grow in complexity and size, completion of the tasks becomes more difficult in a single management window. As a result, in this example, task entries support execution of a handler to service a previous task left unfinished in a previous window.

In another embodiment, task data structure 150 is used to support parallel execution of memory migration code on a plurality of cores of a processor. Previously, memory migration may be accomplished through a chipset memory migration engine or other firmware. Yet, as memory grows in size, the time to migrate different amounts of memory is potentially not efficiently accomplished. Therefore, in one embodiment memory migration code is executed in parallel to accomplish migration of different sections of memory concurrently. Furthermore, a memory migration task may be executed in parallel and span multiple SMM windows, as discussed above.

Figure 2:
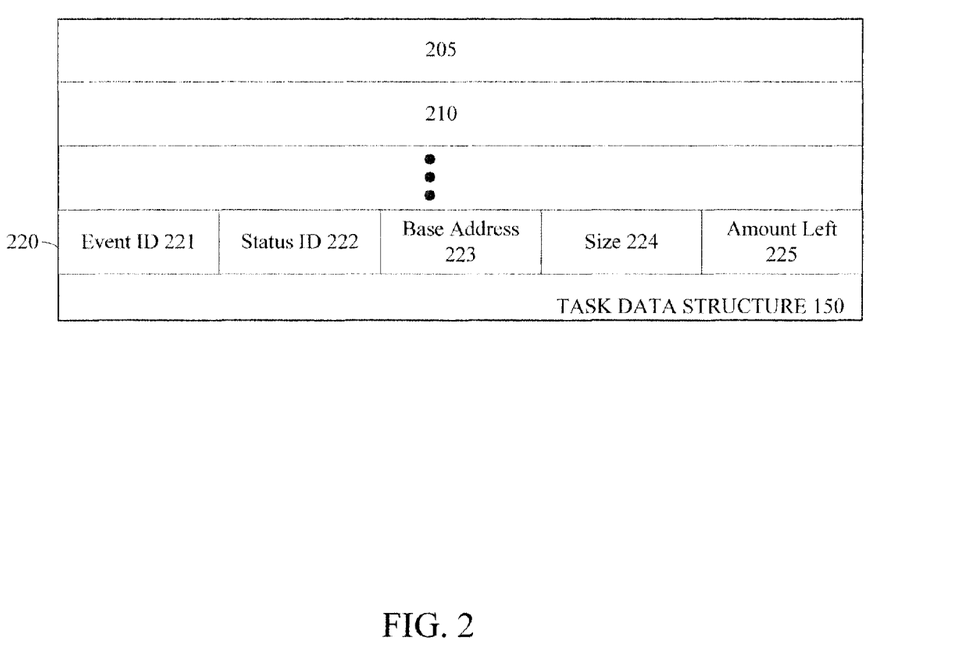
FIG. 2 illustrates an embodiment of a task data structure illustrated in FIG. 1.

Turning quickly to FIG. 2, an illustrative embodiment of task data structure 150 is illustrated. Examples of data structures to be used for task data structure 150 include a queue, an array, a list, a linked-list, a tree, and a stack. In the embodiment shown, task data structure 150 includes multiple entries, such as entries 205, 210, and 220. Entry 220 includes event ID field 221, status ID field 222, base address field 223, size field 224, and amount left field 225. In one embodiment, task data structure 150 is to store entries to support parallel execution of a memory migration task.

For example, assume a memory migration task is to be executed. As a result, an xMI event, such as a signal from memory indicating a portion of memory, such as an exemplary address range expressed in hexadecimal of 0x00000000 to 0x3FFFFFFF, is vulnerable to permanent failure. Processor 160, i.e. cores 161 and 162, are entered into a system management mode (SMM). Entry 220 associated with the memory migration task is stored in task data structure 150. Event ID 221 is to store an identifier to ID the memory migration task. Examples of event ID 221 include a last instruction pointer (LIP) associated with the task, an xMI ID, a reference to an address location/range associated with the xMI, an arbitrary ID assigned to this xMI task, or any other known method of identifying a management task/event.

Status ID 222 is to represent the status of the xMI event, such as a single bit in a first logical state to represent the xMI event is to be serviced and in the second logical state to represent that servicing of the xMI event is complete. For a memory migration event, fields 223-225 are to store what memory is to be migrated and the progress of the migration. In this embodiment, field 223 stores a representation of a base address of the memory to be migrated, such as the address 0x00000000, and a size of the range of memory to be migrated, which in this example is 0x3FFFFFFF. In addition, field 225 is to represent an amount of memory left to migrate. In one embodiment, field 225 stores a representation of an address within the range of memory to be migrated. Here, if no memory is migrated, then field 225 stores 0x00000000 to represent that all of the memory range is left to be migrated. As another example, if the first half of the range has been migrated, then field 225 stores a reference to address location 0x1FFFFFFF. This reference represents that range 0x00000000 through 0x1FFFFFFF has been migrated, while range 0x1FFFFFFF through 0x3FFFFFFF is still left to be migrated. Note that fields 223-225 are purely exemplary, and any method of identify a range of memory to be migrated may be used. In fact, one memory migration task may result in multiple entries in task data structure 150, with each entry including a reference to a portion of the memory to be migrated in support of concurrent memory migration. Alternatively, field 225 may be implemented in a plurality of fields to indicate which portions of the memory to be migrated have actually been migrated.

Continuing the illustrative example, handlers in handler queue 140 are dispatched to available cores, such as core 161 to determine the correct handler to handle the memory migration event. Assuming the appropriate handler for core 161 is determined then execution of the appropriate handler to service the memory migration event is started. In one embodiment, a separate memory migration handler for each core is present in SMM memory space 125. In another embodiment, one memory migration event handler is present in SMM memory space 125, and multiple instances of the handler are provided to multiple different cores.

In parallel, another handler or another instance of an appropriate handler is dispatched to core 162. Core 161 and 162 concurrently execute event handlers to service the memory migration event. As stated above, one event may be split into multiple entries in task data structure 150. In an example with two entries splitting the memory migration event equally, core 161 is tasked with migrating memory 0x00000000 through 0x1FFFFFFF, while core 162 is tasked with migrating memory 0x1FFFFFFF through 0x3FFFFFFF.

In another embodiment, one entry is stored in task data structure 150, and the memory migration event handler(s), i.e. the code as executed, split up the memory to be migrated. Here, core 161 executing a memory migration event handler migrates a first portion of memory, i.e. 0x00000000 through 0x1FFFFFFF, to a second portion of memory and core 162, which is executing another instance of the memory migration event handler or a separate memory migration event handler, migrates a third portion of memory, i.e. 0x1FFFFFFF through 0x3FFFFFFF, to a fourth portion of memory. Upon completing the memory migration, status ID 222 is updated to represent the xMI event is complete. Entry 220 is then potentially de-allocated from task data structure 150.

In another embodiment of task data structure 150's implementation, task data structure 150 is utilized to allow spanning the service of an xMI event for multiple management mode windows. Previously, an xMI is serviced in a single SMM window. However, as servicing of xMI events, even through parallel execution, takes more time away from normal operating system execution, more adverse consequences potentially occur, such as system hangs. Therefore, any xMI event, such as a memory migration task, may also be serviced through multiple SMM windows. As above, when an xMI is received entry 220 is created/stored in task data structure 150. An event ID 221 is stored in entry 220 and a status ID field 222 tracks the status of the xMI event.

Upon a predetermined amount of time in an SMM window or upon a certain portion of the xMI event serviced, control is returned back to the OS, and the xMI is further serviced in a later SMM window. In the first example, a watchdog timer value is associated with the SMM window. The watchdog timer counts upon entering SMM, and upon expiring control is transferred back to a previous operational mode. The watchdog timer may be associated with an operating system to ensure control is not taken by SMM for too long, or the timer may count down from a value stored in task data structure 150 to set a time limit for servicing an xMI.

For example, assume an xMI is generated referencing the exemplary range of memory of 0x00000000 through 0x3FFFFFFF to be migrated. Cores 161 and 162 are entered into a system management mode (SMM) to handle the xMI. Entry 220 is created with event ID 221 referencing the memory migration management event. A watchdog timer value is also stored in entry 220. Event handlers in serial or parallel are executed to service the memory migration event. A watchdog timer, set to the watchdog timer value, begins to count. A portion of the range of memory, such as 0x00000000 through 0x1FFFFFFF, is migrated. The watchdog timer expires representing SMM is to be executed and control is to be returned to a previous mode of operation. Therefore, status ID 222 represents that the xMI task is incomplete field 225 is updated to represent the amount of memory left to be migrated. In the illustration shown, base address field 223 stores 0x00000000, size/ending address field 224 stores 0x3FFFFFFF, and 0x1FFFFFFF would be stored in amount left field 225 to represent 0x00000000 through 0x1FFFFFFF has been migrated and 0x1FFFFFFF through 0x3FFFFFFF is left to be migrated.

Upon receiving a subsequent xMI, which may be generated to complete the memory migration event, initiated to service a second memory migration event, or initiated to service another unrelated xMI event, it is determined whether a previous incomplete management mode task exists. Here, the first memory migration event is incomplete as represented by status ID field 222. In one embodiment, core 161 executes an event handler to further service the first memory migration event, while core 162 executes a handler to service the subsequent xMI, which may include the first memory migration event, the second memory migration event, or the unrelated xMI event. Note that any priority scheme may be implemented in handling multiple SMI events, such as handle all previous xMI's in parallel first and then handle all new xMI events. In contrast, each xMI may be given a weight or priority due to the importance and/or amount of time it would take to service that event.

In any case, when the previous first memory migration task is serviced, the status ID field 222 is updated to complete and entry 220 is de-allocated from task data structure 150. Consequently, xMI tasks are potentially serviceable in parallel through multiple SMM windows, which allows for faster processing times and more flexibility to return control back to operational modes quicker.

Figure 3:
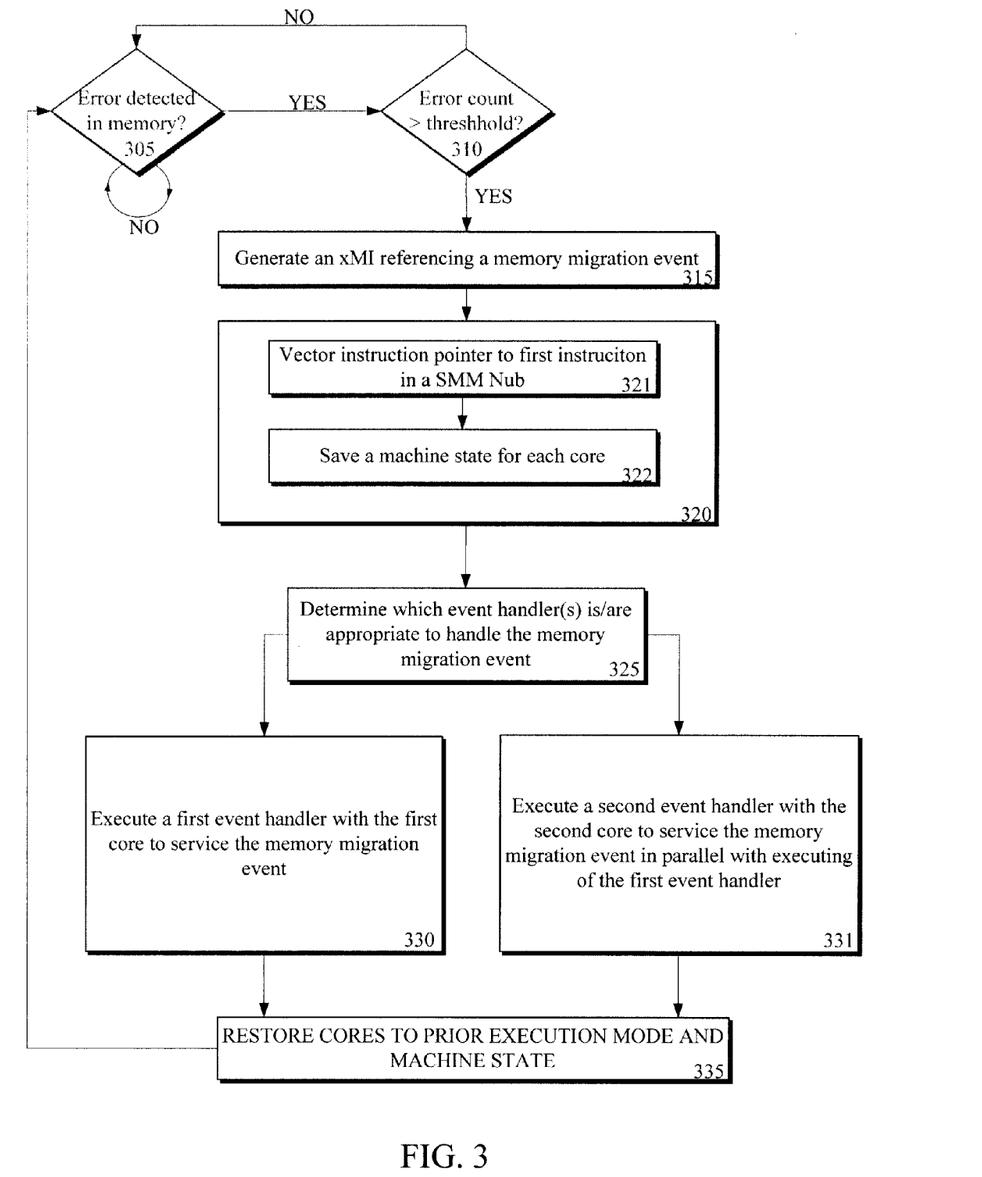
FIG. 3 illustrates an embodiment of a method for concurrently servicing a memory migration task with a plurality of cores.

Turning to FIG. 3 an embodiment of a flow diagram for handling a memory migration event in parallel is illustrated. In flow 305, it is determined if an error is detected in memory.

In one embodiment, periodic checks to memory are used to check for errors. For example, a set bit pattern is written to memory and read back from memory. If any of the written bit pattern changes in the read from memory, then errors where the bit pattern differs is assumed to have occurred. Essentially, it is assumed that the location which stored bits, which were altered during the read back, have caused the error. Other methods of detecting errors or vulnerable memory locations, such as error correction code (ECC), may be used.

If an error is detected, then in flow 310 the error is logged/counted. Depending on the implementation, predicting a location of memory or a portion of memory as vulnerable to failure may be after a number of errors. If a predetermined threshold value of errors has not been detected for a location or portion, then the flow returns to flow 305 in continuing to check for errors. However, if a threshold number of errors is reached or exceeded, then an xMI referencing a memory migration event is generated in flow 315.

The xMI is trapped and/or received by processing resources, such as physical processors, cores, and threads. An xMI, as stated above, refers to a management interrupt, such as a system management interrupt or a processor management interrupt. In general, an xMI event may be generated in response to activation of a pin on the system chipset, bus cycle type, an inter-processor interrupt (IPI), an interrupt that causes a processor to return to a physical mode and execute code registered with a PAL (Processor Abstraction layer), or other event that is known to result in causing a processor to enter into a management mode.

Typically every logical processor, which includes a core or a hardware thread, for executing multiple threads of execution receives the xMI and enters into a management mode, such as a System Management Mode (SMM) in flow 320. In one embodiment, in response to the xMI a processor(s), such as processor 160 including cores 161 and 162, enters/switches into a SMM mode. Here, an instruction pointer is redirected to code in the SMM memory space, such as a first instruction of SMM nub 135, in flow 321. In addition, a machine state for each set of architecture state registers on a processor is then saved in flow 322. For example, for a processor having two cores, the state for each of the two cores is saved.

In one embodiment, legacy handlers are detected and executed. One method of handling legacy handlers is discussed in U.S. Pat. No. 6,775,728 entitled, "Method and System for Concurrent Handler Execution in an SMI and PMI-Based Dispatch Execution Framework."

Next, in flow 325, it is determined which event handler or handlers are appropriate to handle the memory migration event. In one embodiment, a list of event handlers is stored in a handler queue, such as handler queue 140. The handlers are dispatched out of the queue to available processing resources, such as cores on a physical processor. As a result, processing resources are able to execute multiple early portions of handlers in parallel to quickly determine which handler is an appropriate handler for the xMI event.

Often an early portion of a handler is executed to determine if it is the appropriate handler for servicing a specific xMI event. A typical determination of this sort comprises interrogating the hardware component, subsystem, etc. corresponding to the event handler to see if an error has occurred for that object. For example, interrogating firmware or memory to determine if a portion of memory is vulnerable to permanent failure. Note that some handlers may be executable on all cores and/or physical processors, while other handlers may be specifically designated for a single core or physical processor. If a handler is designated for a single resource, then that handler is not dispatched until the designated resource is available. In the meantime, other handlers may be dispatched to other available resources.

In one embodiment, a single handler is loaded in handler portion 130 of FIG. 1, such as Handler 2, for handling memory migration. As an example, assume list of handlers 145 includes handlers 2-5 and queue 140 currently stores references to handlers 2-5 in order. In response to receiving the xMI referencing a memory migration event in flow 315 and entering into a management mode in flow 320, handler 2 is dispatched to core 161 and handler 3 is dispatched to core 162. Through execution of early portions of handlers 2 and 3, core 162 determines that handler 3 is not the correct handler, while core 161 determines that handler 2 is the appropriate handler. A second instance of handler 2 is dispatched to core 162. Core 161 executes handler 2 to service the memory migration event in flow 330, and core 162 executes a second event handler, i.e. a second instance of handler 2, to service the memory migration event in parallel with the first event handler flow 331.

In this example, servicing a memory migration event in parallel includes migrating memory determined to be vulnerable to failure, which resulted in generation of the xMI, with both core 161 and core 162. As stated above, handler 2 is potentially capable of threading the memory migration task between multiple processing resources. As an example, a first portion of the memory to be migrated is tasked to core 161 executing the first instance of handler 2 and a second portion of the memory to be migrated is tasked to core 162 executing the second instance of handler 2. In another embodiment, hardware in receiving the xMI and storing a reference to it in task data structure 150, splits the task into a plurality of sub-tasks. To illustrate, in this example, the xMI in flow 315 is stored as two entries in task data structure 150, with the first entry referencing a first portion of the memory to be migrated and the second entry referencing a second portion of the memory to be migrated. Core 161 in executing the first instance of handler 2 migrates the first portion, as denoted by the first sub-task entry, and core 162 in executing the second instance of handler 2 migrates the second portion, as denoted by the second sub-task entry.

In another embodiment, instead of storing and loading one handler for memory migration, a generic handler and/or a memory migration handler is/are potentially provided for each processing resource. In this example, referring to FIG. 1, driver 3 and handler 3 are associated with core 161, while driver 4 and handler 4 are associated with core 162. As an example, an xMI referencing a memory migration event is generated in flow 315 and processor 160 enters SMM in flow 320. Assuming again that queue 140 references handlers 2-5 in order, handler 2 is dispatched to core 161, which by execution of a portion of handler 2 determines handler 2 is an inappropriate handler for this xMI event. In one embodiment, handler 3 is dispatched to core 162, as it is available, and core 162 determines handler 3 is inappropriate, as it is associated with/designated for core 161. However, in another embodiment, handler queue 140 includes a designation of handler 3 for core 161.

Here, handler 3 is not dispatched to core 162, but rather is dispatched to core 161 after core 161 determines handler 2 is inappropriate. During the wait time, either no handler is dispatched, or handler 4 is dispatched out of queue 140, since core 162 is available and handler 4 is designated for core 162. Core 161 and 162 execute handler 3 and 4, respectively, in flows 330 and 331 to service the memory migration event in parallel. As stated above, the memory migration workload may be split among cores 161 and 162 by software, hardware, firmware, or a combination thereof.

Next, in flow 335 cores 161 and 162 are restored to a prior execution mode and execution state. In other words, processor 160 is exited from management mode and control is returned to the prior processes. For example, SMM is exited and control is returned to an OS, i.e. the machine state for the OS and its associated processes are restored to architecture registers associated with core 161 and 162. Once again, the flow returns to flow 305 to check for errors in memory.

Figure 4:
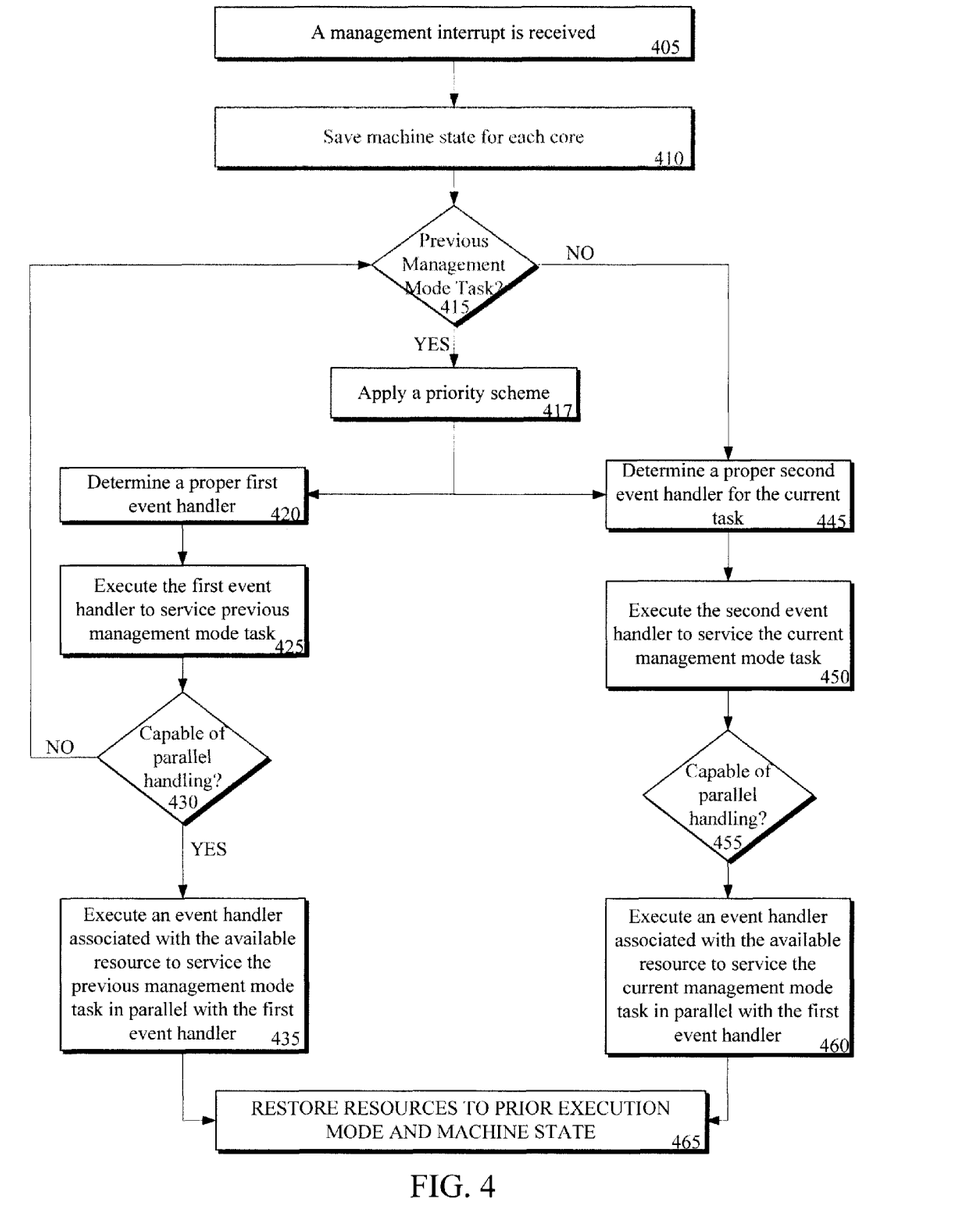
FIG. 4 illustrates an embodiment of a method for concurrently servicing a previous management task and a current management task.

Turning to FIG. 4 an embodiment of a flow diagram for servicing an xMI in multiple management mode windows is illustrated. In flow 405 a management interrupt, such as an SMI or PMI is received. Each resource that receives the management interrupt enters a management mode. For example, a physical processor including four cores saves the state for each of the four cores and begins management mode execution.

In flow 415, it is determined if a previous management mode task is incomplete. In one embodiment, a task data structure, such as data structure 150 from FIG. 1, stores entries associated with management mode tasks. The data structure is checked to see if an entry that is incomplete is present. Examples of data structures for a task data structure include a queue, a list, a linked list, an array, a multi-dimensional array, a tree, and a stack.

After determining a previous management mode task is incomplete, a priority scheme is applied in flow 417. In one embodiment, a priority scheme includes handling all previous tasks before any current tasks. Inversely, each current task may be handled before any previous tasks are serviced.

However, other priority schemes may be applied as well. For example, each task may be given a weight or priority based on any number of factors, such as the amount of time to complete the task, the size of a management window, the number of available resources, etc. As an illustration, a memory migration task is a previous incomplete task that will take approximately four management windows to complete with all four cores of a processor performing memory migration. It may be determined to be unacceptable to tie up all four cores for four management windows, as other management tasks go ignored. As a result, a priority scheme potentially designates one through three of the four cores for memory migration, after discovering the task is still incomplete in flow 415, while reserving one to three cores for other management tasks. It is readily apparent that any priority scheme in scheduling/servicing tasks may be applied. To further the discussion, an exemplary priority scheme of executing previous management mode tasks before current tasks is illustrated FIG. 4.

Therefore, in flow 420 a proper first event handler to handle the previous management mode task is determined. In one embodiment, a generic handler is executed to determine which handler is appropriate to service the previous management mode task. In another embodiment, a task data structure includes a field to store a reference to a proper handler, as determined in a previous window. As another example, different handlers are dispatched to available resources to determine which handler is proper. In the last example, an early portion of the proper first event handler is executed to determine it is the proper handler, and the execution of the proper first event handler is continued in flow 425.

In one embodiment, the first event handler is able to determine if the management interrupt (MI) is capable of being serviced/handled in parallel in flow 430. In one embodiment, list of handlers 145, handler queue 140, or other data structure includes a field associated with each handler to represent whether the handler is able to service events in parallel. In another example, execution of an earlier portion of a proper handler's code in flow 420 is also used to determine if the handler is able to be executed in parallel to service a task. As a result, if multiple resources are available, the workload is split among the correct number of available resources. Note that specific resources may be reserved in priority flow 417 for other management tasks.

If the previous task is not capable of parallel handling, the flow returns to 415 to determine if another previous management mode task is present. If there is another previous management mode task then, the flow follows the same path described above executing another previous management mode task in parallel with the first previous management mode task.

If the first previous management mode task is capable of being handled in parallel, then an event handler associated with the available resource is executed to service the previous management mode task in parallel with the first event handler in flow 435. As above, multiple instances of the first event handler may be created, where the event handler associated with the available resource is a second instance of the first event handler. As another example, each resource is associated with separate event handlers. Here, a separate handler, which is associated with a second resource, is executed in parallel with the first event handler to also service the previous management mode task. Once again, if multiple resources are available, then each resource potentially executes a handler or instance of a handler to service the previous management mode task in parallel.

Returning to flow 415, either on a first pass where no previous management mode task is present, after the priority scheme is applied, after determining a previous management mode task is not capable of being serviced in parallel in flow 430, or execution of all the previous management mode tasks have completed with additional time for task handling, then in flow 445 a proper second event handler for a current task is determined. As an example, assume a processor has four cores. Assuming in flow 417, at least one core is reserved for handling the current task and in flow 435 the first three cores are executing handlers to service the first previous management mode task in parallel. Then handlers are dispatched to the fourth reserved core to determine which handler is the proper handler for the current task. In another example, a previous task is potentially not capable of being handled in parallel, as there is contention for access to the resources to be serviced. Here, three of the four cores are available in flow 445. Therefore, handlers are dispatched to each of the three cores to determine which handler is the proper handler for the current task.

In flow 450, the second proper event handler for the current task is executed to service the current task. Note that in the example, where the first three cores are servicing the first previous management mode task, the fourth core is executing the second event handler to service the current task in parallel with the first three cores executing handlers to service the previous task.

In another example, such as when a previous task is not capable of parallel handling, there are potentially multiple resources available to service the current management mode task. Therefore, in flow 455 it is determined if the current task is capable of being handled in parallel. Similar in operation to flows 430 and 440, flows 455 and 460 determine what resources are available and execute event handlers, which may be instances of the proper second event handler that are associated with the available resources, to service the current task. Lastly, upon exiting the management mode, resources are restored to their prior execution mode and machine state in flow 465.

Figure 5:
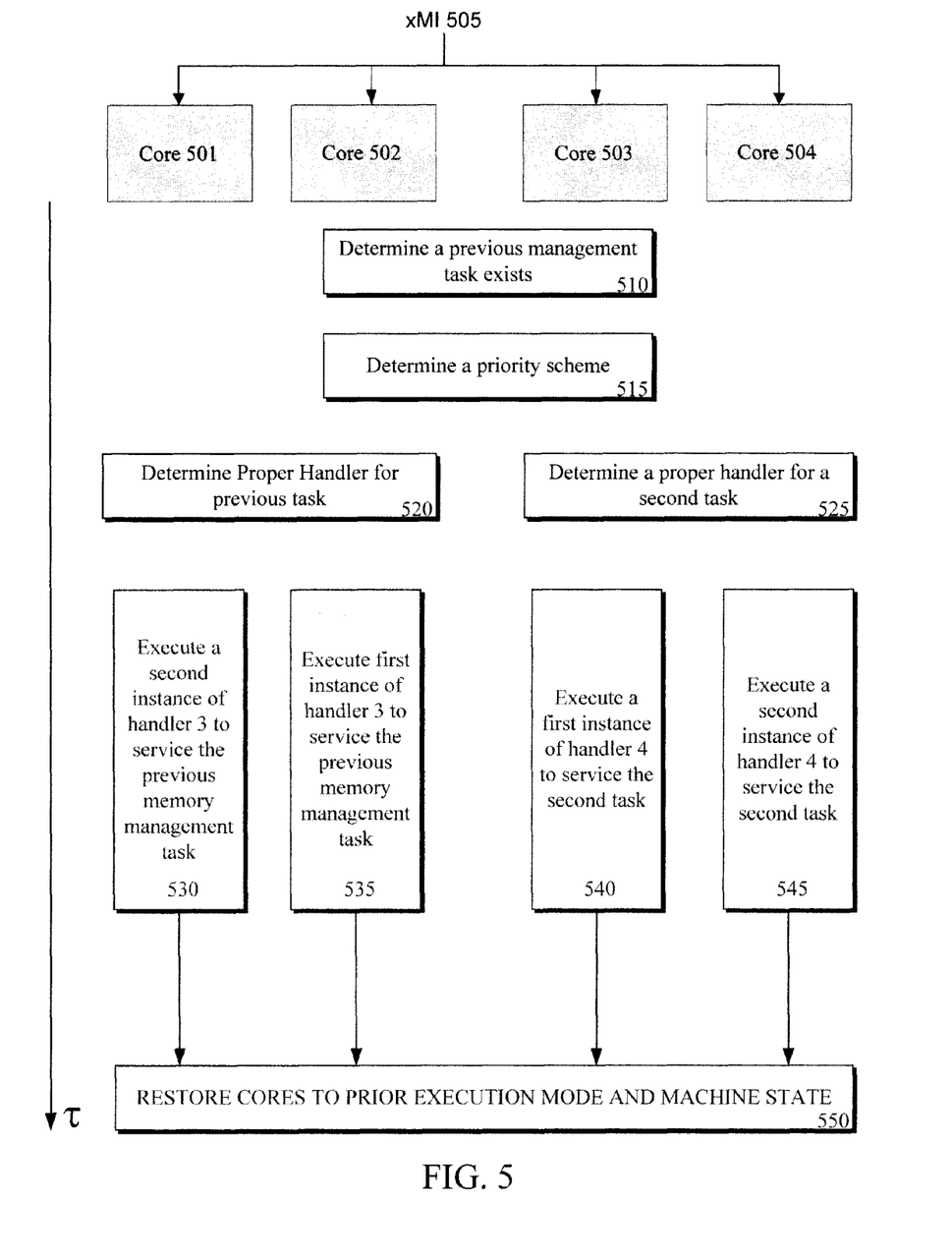
FIG. 5 illustrates an embodiment of a timeline for a method of concurrently servicing a previous management task and a current management task.

Turning to FIG. 5, an embodiment of a timeline for executing a current task and a previous task in parallel is illustrated. As illustrated, physical processor 500 includes four cores 501-504. In the previous example, most of the discussion included a priority scheme for utilizing available resources, where previous tasks are executed before current tasks. In that embodiment, cores 501-504 execute the previous task until completion and then execute current management tasks.

However, if an extremely large task spans multiple windows, it is potentially advantageous to assign specific resources to the previous task, reserve resources for other tasks, or apply other known execution schemes, such as time-slicing, to ensure other tasks are serviced properly. For example, in a time-slicing scheme, a previous task may be executed in parallel with cores 501-504 for a predetermined amount of time. The rest of a management window is potentially then dedicated to servicing current management tasks.

In FIG. 5, cores 501-502 are reserved for servicing a previous memory management task and cores 503-504 are reserved for servicing a current task. From another perspective, cores 501-502 are assigned to handle any previous management mode tasks, and cores 503-504 are assigned to handle any current tasks. Yet, if no previous tasks are present, then all of cores 501-504 are available to service current tasks.

Therefore, as an example of the embodiment illustrated in FIG. 5, assume a first amount of errors in a memory is detected. The first amount of errors exceeded a memory migration threshold resulting in an xMI being generated. Cores 501-504 enter a management mode. An entry in a task data structure is created referencing the memory migration task. Proper handler(s) are determined for the memory migration task and a portion of the memory is migrated. However, the memory migration task is not completed before the management window expires and is to return cores 501-504 to previous modes of operation. The entry in the data structure is updated to represent how much of the migration is completed and/or how much of the migration is left to be completed.

Next, an interconnect device requiring services initiates generation of another xMI 505, which is received by cores 501-504. Once again cores 501-504 enter a management mode. For example, an instruction pointer for each core is redirected to management mode instructions and the sate for each cores is saved. In flow 510, it is determined that a previous management mode task exists. Here, the task data structure is checked, which finds the memory migration task entry associated with an incomplete status identifier.

In flow 515, a priority scheme, which may include resource assignment, time-slicing, a combination of both, or other scheme for determining priority of management tasks, is determined. For example, a combination of time-slicing and resource assignment includes dispatching handlers to all of cores 501-504 to determine the proper handler for the previous memory migration task and then after determining the proper memory migration handler, dispatching handlers to all of cores 501-504 to determine the proper handler for the current interconnect device task. Then cores 501-502 are assigned to execute the proper handlers for the previous memory migration task, while cores 503-504 are tasked with servicing the current interconnect device task in parallel.

However in FIG. 5, an exemplary priority scheme reserves cores 501-502 for servicing the previous memory migration task and cores 503-504 for servicing the current interconnect device task. Therefore, in parallel a proper handler for the previous memory migration task is determined in flow 520 and a proper handler for the current interconnect device task is determined in flow 525. As an example, handlers are dispatched to core 501 and 502 and the early portion of each handler is executed to determine if they are the proper handlers for servicing the previous memory migration task. In a similar manner, handlers are dispatched to cores 503 and 504 for the current interconnect device task.

Assuming handler 3 is the proper memory migration handler, which was dispatched to core 502 and handler 4 is the proper interconnect device handler, which was dispatched to core 503, then core 502 is to execute a first instance of handler 3 in flow 535, core 501 is to execute a second instance of handler 3 in flow 530, core 503 executes a first instance of handler 4 in flow 540, and core 504 executes a second instance of handler 4 in flow 545. Once again, upon exiting the management mode, cores 501-504 are restored to their prior execution modes and machine states in flow 550.

The embodiments of methods, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical, optical, acoustical or other form of propagated signals (e.g., carrier waves, infrared signals, digital signals); etc.

As illustrated above, memory migration tasks, which are growing larger and more time consuming, are more efficiently executed in parallel. In addition, for management tasks that are too large to complete in a single management window, previous tasks are tracked and serviceable through multiple windows. By implementing a tailored priority scheme, the efficient serviceability of current tasks versus previous outstanding management tasks may be balanced.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
receiving an event indicator referencing a memory migration task;
entering a number of processing elements of a processor into a management mode in response to receiving the event indicator;
determining memory migration code appropriate for service the memory migration task and concurrently executing the memory migration code on a plurality of the number of processing elements, during the management mode, to service the memory migration task.

2. The method of claim 1, wherein the management mode is a System Management Mode (SMM), and wherein the event indicator is an management interrupt (xMI).

3. The method of claim 2, wherein the xMI is generated by firmware to detect errors in a system memory coupled to the processor.

4. The method of claim 1, wherein entering the number of processing elements of the processor into a management mode in response to receiving the event indicator comprises:
vectoring an instruction pointer to code associated with a beginning execution of the management mode; and
saving a machine state of each of the number of processing elements.

5. The method of claim 4, wherein concurrently executing memory migration code on the plurality of the number of processing elements, during the management mode, to service the memory migration task comprises:
executing a first memory migration handler with a first processing element of the plurality of the number of processing elements to service the memory migration task; and
concurrently executing a second memory migration handler with a second processing element of the plurality of the number of processing elements to service the memory migration task.

6. The method of claim 5, wherein the second memory migration handler is a second instance of the first memory migration handler.

7. The method of claim 5, wherein the second memory migration handler is a second memory migration handler designated for the second processing element.

8. The method of claim 5, wherein the first memory migration handler code includes machine code to migrate a first portion of a memory coupled to the processor to a second portion of the memory, and wherein the second memory migration handler code includes machine code to migrate a third portion of the memory to a fourth portion of the memory.

9. The method of claim 8, wherein the machine code to migrate the first portion of the memory to the second portion of the memory and the machine code to migrate the third portion of the memory to the fourth portion of the memory includes an instruction selected from a group consisting of InternalMemCopyMem, MOVS, MOVSB, MOVSW, MOVSD, REP MOVS, REP MOVSB, REP MOVSW, and REP MOVSD.

10. The method of claim 5, further comprising: returning each of the number of processing elements of the processor to a previous operating mode and to the saved machine state of each of the number of processing elements in response to completing executing of the first and the second memory migration handler.

11. A method comprising:
receiving a management interrupt;
entering a microprocessor into a management mode in response to receiving the management interrupt;
determining that a previous management mode task is incomplete;
executing a first event handler to service the incomplete previous management mode task with a first thread executing on the microprocessor, and executing a second event handler to service a second task in parallel with the first event handler using a second thread executing on the microprocessor.

12. The method of claim 11, the management interrupt is an xMI and the management mode is a system management mode.

13. The method of claim 11, determining that the previous management mode task is incomplete comprises:
checking a data structure stored in a management mode memory space of a memory coupled to the microprocessor and the data structure includes a reference to the previous management mode task associated with an incomplete status identifier.

14. The method of claim 13, wherein the data structure is a linked list, and wherein an entry of the linked list stores the reference to the incomplete previous management mode task and the incomplete status identifier.

15. The method of claim 14, wherein the incomplete previous management mode task includes a memory move task, and wherein the entry of the linked list also stores:
a base address of a range of memory to be moved;
a size of the range of memory to be moved; and
a reference to an amount of the range of memory left to be moved.

16. The method of claim 15, wherein the second task also includes the memory move task, and wherein executing the first event handler to service the incomplete previous task including the memory move task with the first thread executing on the microprocessor and executing the second event handler to service the second task including the memory move task in parallel with the first event handler with a second thread executing on the microprocessor comprises:
executing machine code in the first event handler with the first thread to move a first portion of the amount of the range of memory left to be moved, and executing machine code in the second event handler with the second thread to move a second portion of the amount of the range of memory left to be moved.

17. The method of claim 16, wherein the second event handler is a second instance of the first event handler.

18. A system comprising:
a memory device to store a data structure in a management mode memory space, the data structure to store a state of a memory move task;
a processor coupled to the memory device, the processor including a first processing element and a second processing element, wherein the first and second processing elements enter a management mode in response to receiving a management interrupt, and wherein during the management mode, the first processing element is to execute a first handler to move data from a first portion of the memory device to a second portion of the memory device based on the state of the memory move task stored in the data structure, and the second processing element is to concurrently execute a second handler to move data from a third portion of the memory device to a fourth portion of the memory device based on the state of the memory move task stored in the data structure, wherein the processor to determine that the first and second handlers are the appropriate handlers from a group of handlers.

19. The system of claim 18, wherein the data structure comprises an entry to store:
a reference to a range of the memory device associated with the memory move task; and
a reference to an amount of the range of the memory device associated with the memory move task left to be moved.

20. The system of claim 19, wherein a reference to the range of the memory device comprises:

a reference to a base address of the range of the memory device and a size value of the range of the memory device.

21. The system of claim 20, wherein a reference to an amount of the range of the memory device associated with the memory move task left to be moved comprises a reference to a current address within the range of the memory device, the amount of the range of the memory device associated with the memory move task left to be moved being bounded by the reference to the current address and an end of the range address to be obtained by adding the size value to the reference to the base address.

22. The system of claim 19, wherein the first and third portions of the memory device are within the amount of the range of the memory device associated with the memory move task left to be moved.

23. The system of claim 19, wherein the data structure is selected from a group consisting of a queue, an array, a list, a linked-list, a tree, and a stack.

* * * * *